Feb. 19, 1957 G. L. BOSMAN 2,782,326

APPARATUS USED IN THE APPLICATION OF PHYSIOTHERAPEUTIC CURRENTS

Filed Dec. 6, 1952 4 Sheets-Sheet 1

Gustave Léon Bosman
INVENTOR

By Richardson, David and Norton
his ATTYS

Gustave Léon Bosman
INVENTOR
By Richardson, David and Nordon
his ATTYS

Gustave Léon Bosman

By Richardson, David and Norton his ATTYS.

Feb. 19, 1957 G. L. BOSMAN 2,782,326

APPARATUS USED IN THE APPLICATION OF PHYSIOTHERAPEUTIC CURRENTS

Filed Dec. 6, 1952 4 Sheets-Sheet 4

Gustave Léon Bosman

By Richardson, David and Nordon his ATTYS

United States Patent Office 2,782,326

Patented Feb. 19, 1957

2,782,326

APPARATUS USED IN THE APPLICATION OF PHYSIOTHERAPEUTIC CURRENTS

Gustave Léon Bosman, Brussels, Belgium, assignor, by mesne assignments, to Soprotec Societe de Promotion Technique, Luxembourg, a corporation of Luxembourg Application December 6, 1952, Serial No. 324,547

Claims priority, application Belgium December 11, 1951

14 Claims. (Cl. 307—106)

Figure 1:
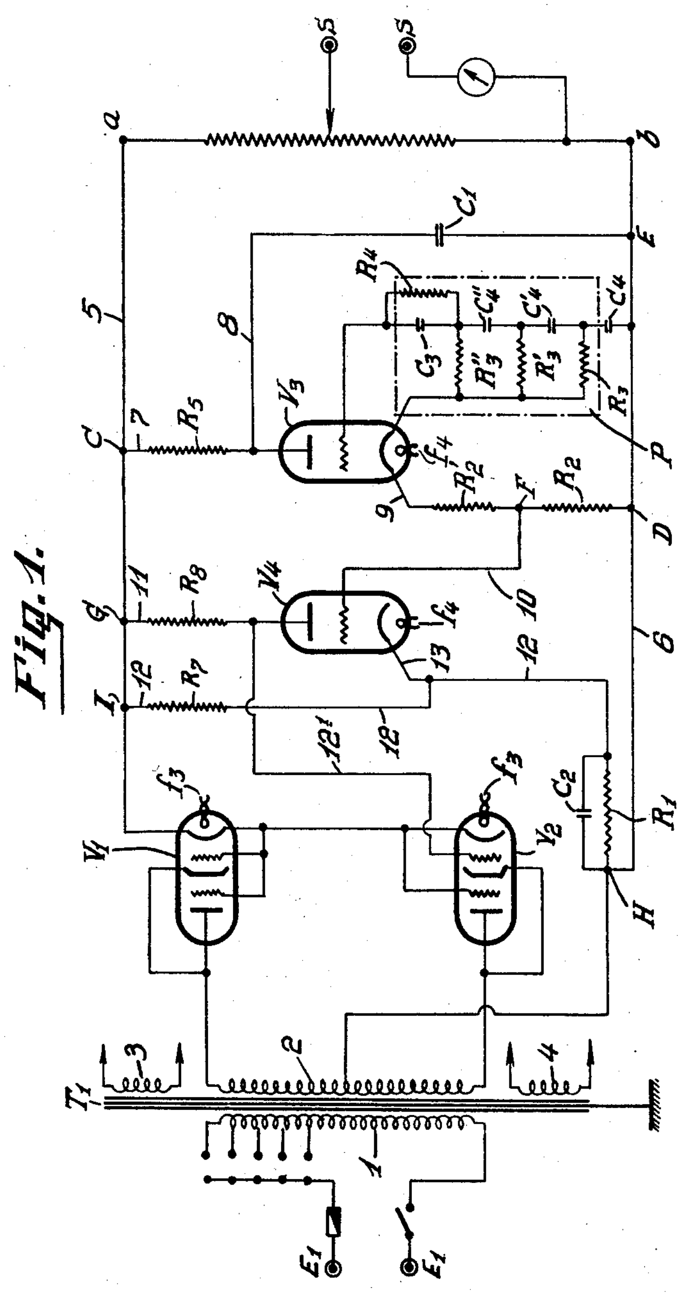
Figure 2:
Figure 3:
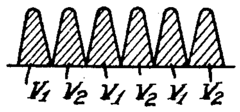

My present invention relates to methods and apparatus used in the application of physiotherapeutic currents.

It is known that the therapeutic effect of currents employed in electrotherapy is determined by their form, frequency, intensity and duration of application. To obtain the widest therapeutic application arrangements are used which ensure the production of several currents of different therapeutic properties distributed by a single apparatus. For this reason apparatus used in physiotherapy should produce a considerable number of currents differing in form, polarity, frequency and intensity. It is often required during such application, in order to guard against the tissues becoming accustomed to the effect, that the current should be changed in some aspect periodically or aperiodically, that is to say, the apparatus should follow automatically a predetermined programme in emitting the various currents.

The realization of this gives rise to considerable complication of apparatus since it must comprise not only diverse sources of therapeutic current but also automatic mechanisms controlled by electric motors, cams, etc. Such apparatus is usually very complicated, cumbersome and fragile and includes mechanical or manual controls (motors, cams, commutators, contacts, rotary cursor, etc.) subject to wear. The object of the present invention is to extend the field of application of known apparatus and to provide an arrangement answering the requirements of users.

The process according to the invention is characterized essentially in that one or several sources of therapeutic current of the same or different characteristics are connected to a supply source over a circuit arranged in such a manner that an interruption of the supply current may be produced by a change in or by the flow of the therapeutic currents.

In order to put the method into practice, a modulator device may be used which is characterized in that it comprises a transformer fed by a generator of alternating current at the desired frequency and in that the transformer feeds two valves with control grids which convert the alternating current to a unidirectionally pulsating current of which the intensity or the phase is controlled by the grids of the valves by means of a modulator, fed by changes in the currents obtained from the physiotherapeutic applications, which in its turn is controlled by a rhythm generator fed also by these changes.

According to another embodiment, one or several sources of therapeutic current of similar or different characteristics are connected to the supply source through the intermediary of one or several relays in such a manner that the source or sources of therapeutic current by reason of consumption of the supply energy and by the action of the relays, give rise to an interruption in their own supply currents for a period determined or regulated at will by the mechanical or thermal inertia of the relays or by the electrical inertia of the supply circuit, the sources thus supplying two or more therapeutic currents combined or superposed according to the effect and the duration of interruption of the supply currents.

Figs. 1, 7, 8, 9, 10, 12, 13, 14 and 15 illustrate circuit arrangements of the apparatus.

Figs. 2, 3, 4, 5, 6, 11, 12*a*, 12*b*, 12*c*, 13*a*, 14*a*, 15*a* and 15*b* illustrate various wave shapes which can be produced.

In Fig. 1 of the accompanying drawings T1 is a transformer comprising a primary winding 1 and three secondary windings 2, 3 and 4. The secondary winding 2 serves to feed the anodes of two electronic tubes V1 and V2 connected in push-pull arrangement, whilst the secondary windings 3 and 4 feed (by conductors not shown) the filaments of these tubes and those of two other tubes V3 and V4. Alternating current of appropriate frequency is thus transformed by the transformer $T_1$ into the appropriate voltages necessary to feed the different filaments as well as the anode voltages of the tubes V1 and V2. For example the secondary winding 3 may feed the filaments *f*3 of tubes V1 and V2 and the secondary winding 4 the filaments *f*4 of the tubes V3 and V4.

The tubes V1 and V2, in the example shown, are illustratively indicated as two pentodes but may be replaced by triodes or other control grid electronic tubes. They convert the alternating current to full-wave rectified current of the type shown in Fig. 2 which appears between points *a* and *b* at the moment when the control grids are connected to their respective cathodes the input of current to the arrangement being shown at $F_1$ and the output at S (Fig. 1).

A part of the full-wave rectified current is taken off between on the one hand, point C (situated on the conductor 5 leading the current into *a*) and on the other hand, D and E (situated on the conductor 6 leading the current into *b*). A resistance R5 in series with a condenser C1 filters the rectified current to provide anode current for V3. R5 is situated in lead 7, branched from lead 5, which feeds the anode of tube V3 and to which is connected, beyond the resistance R5, a lead 8 connected to point E and in which is connected condenser C1. The point D is connected to the cathode of V3 by a lead 9 in which are serially connected resistances R2 and R'2. Across V3 there appears between the anode and the point D a steady voltage which feeds the tube V3, the load circuit of which is formed by the cathode circuit resistors R2 and R'2.

An important characteristic of the invention is that across this load is disposed a phase changing arrangement which applies between the cathode and the grid of V3 a voltage, the insertion of which has the effect as the desired frequency of inverting the phase of the current flowing through lead 7 and of maintaining in V3 a sinusoidal or transitory oscillation for as long as V3 compensates by its slope and its coefficient of amplification the loss introduced by the phase changing arrangement.

An output is taken off between points F and D and serves to control the tube V4 by applying a control potential between its grid and cathode over the lead 10. The tube V4 is supplied with operating potentials from points G, H and I by currents having the wave form shown in Fig. 2. One part of these currents flows through a resistance R8 in lead 11 connected to lead 5 and terminating at the anode of tube V4; another part of the currents flows through lead 12 in which the resistances R1 and R7 are located and joined to the center tap of the secondary winding 2. A condenser C2 maintains across R1 a D. C. voltage which over a lead 13 connected to the cathode of tube V4 biases the grid of V4 to cut-off when no current flows in R2.

It will be observed that when no current flows in R2 no current flows in R8 which has the effect of connecting (by lead 12') the grid of V2 to its cathode through R8 with zero bias. Consequently the grid of V2 in the absence of grid current is connected to its cathode across R8. The operation of each of the two tubes V1 and V2 is similar and the alternate operation of each of the two tubes V1 and V2 may at the moment considered be illustrated by the showing of Fig. 3.

Figure 4:
Figure 5:

When an alternating current circulates in R2, the tube V4 becomes more or less conducting at the circuit rhythm of this current so as to cause a current having the form shown in Fig. 4 to flow through R8. This current biases the grid of V2 negatively with respect to its cathode at this rhythm. At this time across *a* and *b* experience shows that there is received a current of the form presented in Fig. 5. This current of V2 is thus modulated at the rhythm of the frequqency produced by V3.

Figure 6:

If C1 and C2 are sufficiently large, the control of the two tubes V1 and V2 may be exercised by their respective grids as in the foregoing and a current having the form shown in Fig. 6 is obtained.

At the desired frequency there may be incorporated in the grid circuit of V3 a resistance R4 and a condenser C3 in parallel having the effect of biasing the grid with respect to the cathode upon passage of grid current, care being taken to provide a time constant longer than the desired frequency. This arrangement improves the sinusoidal form of the current received across the load resistance R2 of the cathode.

Figure 7:
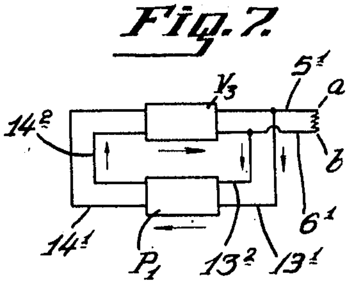
Figure 8:
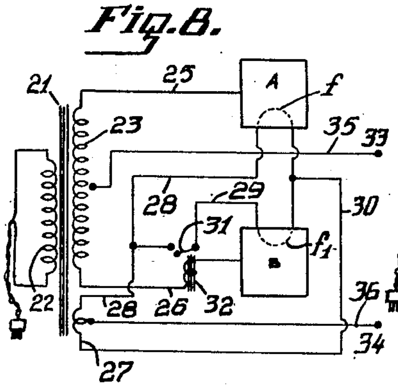

The phase changing arrangement used in the example of Fig. 7 is based upon an arrangement which comprises essentialy the tube V3 and a network composed of a high-pass filter of three or other appropriate number of similar sections, that is to say, of a circuit offering an impedance which diminishes as the frequency increases.

Such a circuit is not only devoid of any oscillatory character but moreover is aperiodic and does not present a maximum as a function of frequency. Nevertheless calculations and experience show that there is an inversion of phase between the input and the output for a given value of frequency which is neither zero nor infinity.

As will be readily understood upon considering the circuit diagram of the phase changing arrangement $P_1$, the phase changing is produced by reason of the time necessary to charge successively the condensors C4, C4′, C4″.

V3 may be replaced by any other arrangement producing a control potential suitable for modulating the tubes V1 and V2 by the modulator V4. V3 may be replaced by a thyratron or a gas discharge tube.

As the rhythm generator V3 there may be used (Fig. 7) a generator of the resistance capacity type based upon the principle of phase change in an RC network being able to maintain sinusoidal or transitory oscillations (Fig. 7).

In Fig. 7 is shown a tube V3, leads $5_1$ and $6_1$ feeding the load, leads $13_1$ and $13_2$ branched respectively from $5_1$ and $6_1$ and connected to the phase changing arrangement and leads $14_1$ and $14_2$ interconnecting the phase changing arrangement and the tube V3.

The advantages obtained by the modulating apparatus according to the invention are as follows:

(*a*) Complete absence of automatic mechanical arrangements and of relays or cams.

(*b*) The modulator is completely electronic, in certain cases electronic and ionic. Its operation is independent of the usual loads and permits the production of impulses modulated in different forms from sinusoidal to impulsive.

(*c*) Flexibility of reaction ranging from one microsecond to several days.

According to a further embodiment the periodic or aperiodic interruption or gradual change of the various therapeutic currents may be produced by a simple relay arrangement energised by the sources of therapeutic currents themselves.

To this end two or several sources of therapeutic currents of similar or different characteristics are coupled in one or several supply circuits of continuous or alternating current in such a manner that the source or sources of therapeutic currents themselves interrupt, due to the consumption of supply energy, the supply circuits for a period determined either by the mechanical inertia of interruptors, by thermal (bi-metal) or electric thermionic inertia of valves, time constant CR) inertia of the circuit effecting the interruption of supply.

Two sources of therapeutic current of similar or different characteristics A and B (Fig. 8) may be fed by a transformer 21 having a primary winding 22 and of which a winding 23—24 supplies anode voltage (over leads 25 and 26) and a winding 27 the heating current of the filaments *f* (over the leads 28—29—30). In lead 29 is provided a contact 31 which cooperates with an electromagnet 32 the winding of which is formed by the lead 26.

When the source B draws anode current, the electromagnet 32, or any other magnetic electric or thermal relay, operates the switch 33 and opens the supply circuit of the filament *f* of element B.

Taking into account the magnetic inertia of the electromagnet 32, the mechanical inertia of the switch 31 and the thermal and electric inertia of the source of therapeutic current B, this state of interruption endures for a certain predetermined time after which the switch 31 either under the effect of springs or due to lack of current through the electromagnet 32 returns to normal and energises anew the supply source B. But as the source is not interrupted on the supply side it supplies in a permanent manner, at the terminals 33 and 34 connected by the leads 35—36 to the windings 23—24 and 27, the therapeutic currents of characteristic A whilst the source B, periodically deprived of supply current, delivers to the same terminals 33 and 34 interrupted therapeutic currents superposed on the permanent currents A.

Figure 9:
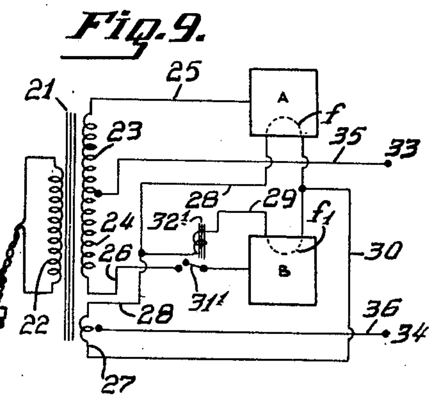

In the case of Fig. 9 it is the filament current which acts through the relay 32′ effecting interruption of the anode current.

Figure 10:
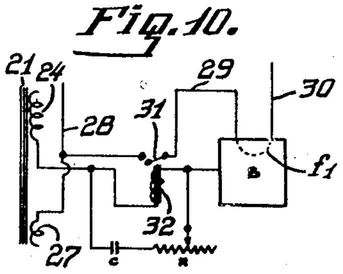

The magnetic relay like all other electric relays may be energised over a regulable time base circuit formed for example by the insertion of a condenser C and a resistance R in the circuit feeding the relay 32 (Fig. 10). In this case by varying the capacity C or the resistance R, the periods of operation and interruption of the source of therapeutic currents B may be modified at will.

Figure 11:
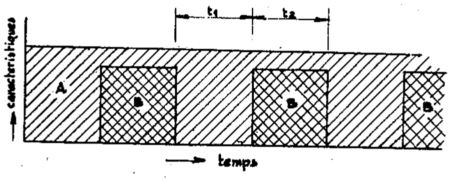

Fig. 11 shows schematically the superposition of current of characteristics B on permanent current of characteristic A; the periods of superposition $t_2$ and interruption $t_1$ being determined in a fixed or regulable manner.

Figure 12:
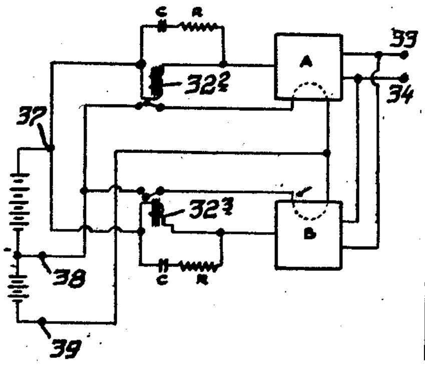
Figure 12A:
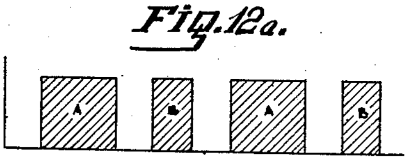
Figure 12B:
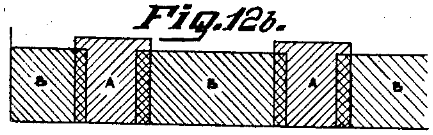
Figure 12C:

Fig. 12 illustrates the case where two sources of therapeutic current 2A and B of similar or different characteristics are supplied with anode current (terminals 37 and 38) and continuous or alternating filament current (terminals 38 and 39) acting together on the interruptor relays $\mathbf{32^2}$ and $\mathbf{32^3}$ in the manner explained above, the period of operation of these two relays being differently regulated in such a manner that the therapeutic currents of characteristics A and B appear across 33 and 34 in an alternating interrupted fashion (Fig. 12*a*) or in an uninterrupted fashion by effecting a symmetrical and alternating superposition (according to Fig. 12*b*) or by diversity of times of interruption or of application by causing interference and by acting periodically in alternative fashion or superposed fashion according to Fig. 12*c*.

Figure 13:
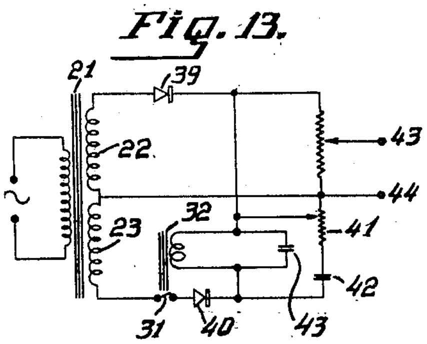
Figure 13A:
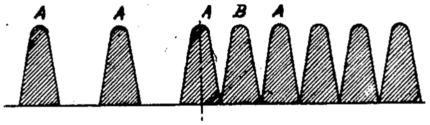

The present invention may be put into effect in the most simple manner according to Fig. 13. A transformer 21 supplies through two windings 22 and 23 two rectifiers 39—40 of metal oxide or other type constituting in this case the sources of therapeutic current (rectified alternating current). The consumption of current by the resistance 41 as well as by the electromagnet 32 initiates operation of the switch 31 bringing about a periodic interruption of the supply to rectifier 40 determined by the value of the time constant of resistance 41, the condenser 42 and the condenser 43. Thus the rectifier 39 being supplied with alternating current in an uninterrupted fashion furnishes at terminals 43 and 44 the rectified current A according to Fig. 13*a*; the energizing of rectifier 40 superposes in this current A another phase of rectified current B phase displaced by 180° according to Fig. 13*a*. The operation of the arrangement thus manifests itself by the rectified current in the form of impulses of which the frequency varies periodically.

Figure 14:
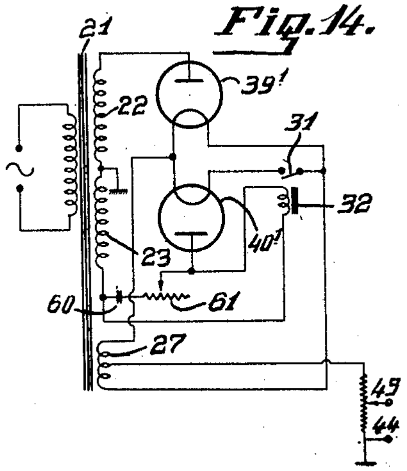

Fig. 14 shows the same circuit wherein the metal oxide rectifiers have been replaced by electronic valve rectifiers 39′ and 40′. The relay may act, according to the invention, to effect interruption of the supply or filament heating current, the time bases being regulable by the values of the condenser 60 and of the resistance 61. Assuming that the thermal inertia of the emission of the electronic valves is sufficiently large, the doubling of frequency does not manifest itself in a rapid manner as in Fig. 13*a* but in a progressive manner as in Fig. 14*a*.

Figure 15:
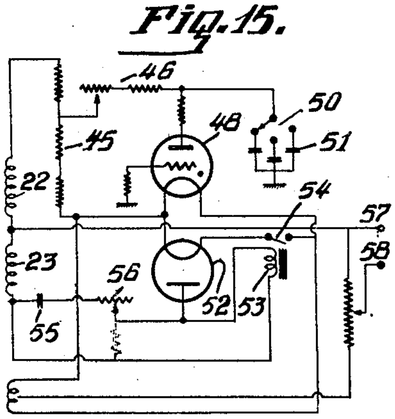
Figure 14A:
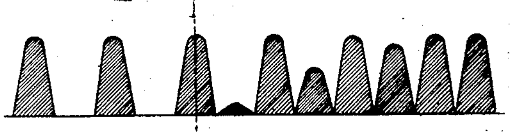

One of the valve rectifiers may be replaced by a thyratron sweep circuit according to Fig. 15. The thyratron valve 48 works into a circuit constituted by the potential dividers 45 and 46 and the discharge condensers 50 furnishing faradic currents of relatively high frequency the frequency of which may be regulated by the choice of capacity 51 and the regulation of the resistance 46.

Figure 15A:
Figure 15B:

This tube being energized in a continuous manner through the winding of transformer 22 supplies at the frequency of 50 per second impulses of faradic current according to Fig. 15*a*. The valve rectifier 52 being energized over the relay 53 and the switch 54 regulated by the time bases 55 and 56 produces periodically according to Fig. 14*a* single phase rectified currents effecting in a gradual manner a superposition with the faradic currents with a phase displacement of 180°.

It will be understood that the interruption circuit comprising the elements 53—54 may be arranged to act upon the supply to the thyratron valve while permitting the valve 52 to function continuously. In this case rectified alternating current appears across the terminals 57 and 58 continuously and the faradic current appears periodically being superposed upon the latter according to Fig. 15*b*.

The application of the principles described above also extends according to the present invention to the case where the sources of similar or different current A and B do not act directly as sources of therapeutic current but are used as supply sources for apparatus furnishing the therapeutic currents.

What I claim is:

1. In a current impulse modulator device for physiotherapeutic applications in combination a transformer supplied externally by a generator of alternating current at the desired frequency two valves having control grids and arranged so as to be fed in current by said transformer and to convert the alternating current to impulsive current, the phase of which is adapted to be controlled by the grids of said valves, a modulator supplied by changes in the currents for physiotherapeutic use and acting so as to control said grids and a rhythm generator similarly supplied by a change in the current produced by such changes and whereby said modulator is controlled, one part of the current taken from the load circuit of the rhythm generator serving to control the modulator valve between the grid and cathode of this valve.

2. In a current impulse modulator device for physiotherapeutic applications in combination a transformer supplied externally by a generator of alternating current at the desired frequency two valves having control grids and arranged so as to be fed in current by said transformer and to convert the alternating current to continuous current, the intensity of which is adapted to be controlled by the grids of said valves, a modulator supplied by changes in the currents for physiotherapeutic use and acting so as to control said grids and a rhythm generator similarly supplied by a change in the currents produced by such changes and whereby said modulator is controlled, one part of the current taken from the load circuit of the rhythm generator serving to control the modulator valve between the grid and cathode of this valve.

3. In a current impulse modulator device for physiotherapeutic applications in combination a transformer supplied externally by a generator of alternating current at the desired frequency two valves having control grids and arranged so as to be fed in current by said transformer and to convert the alternating current to impulsive current, the phase of which is adapted to be controlled by the grids of said valves, a modulator supplied by changes in the currents for physiotherapeutic use and acting so as to control said grids and a rhythm generator similarly supplied by a change in the currents produced by such changes and whereby said modulator is controlled, the anode of the modulator valve being supplied with current for physiotherapeutic use partly through a lead in which is located a resistance and connected to this anode and partly by a lead in which are located resistances, and a D. C. voltage being maintained across one of those resistances by a condenser which voltage, over a lead connected to the cathode of the modulator, biases the grid of the modulator with respect to the cathode in such a manner that no current flows through the modulator between anode and cathode when no current flows through the load circuit of the rhythm generator, the grid of one of the generator tubes being thus connected to its cathode through the resistance.

4. In a current impulse modulator device for physiotherapeutic applications in combination a transformer supplied externally by a generator of alternating current at the desired frequency two valves having control grids and arranged so as to be fed in current by said transformer and to convert the alternating current to continuous current, the intensity of which is adapted to be controlled by the grids of said valves, a modulator supplied by changes in the currents for physiotherapeutic use and acting so as to control said grids and a rhythm generator similarly supplied by a change in the currents produced by such changes and whereby said modulator is controlled, the anode of the modulator valve being supplied with current for physiotherapeutic use partly through a lead in which is located a resistance and connected to this anode and partly by a lead in which are located resistances, and a D. C. voltage being maintained across one of those resistances by a condenser which voltage over a lead connected to the cathode of the modulator biases the grid of the modulator with respect to the cathode in such a manner that no current flows through the modulator between anode and cathode when no current flows through the load circuit of the rhythm generator, the grid of one of the generator tubes being thus connected to its cathode through the resistance.

5. In a current impulse modulator device for physiotherapeutic applications in combination a transformer supplied externally by a generator of alternating current at the desired frequency two valves having control grids and arranged so as to be fed in current by said transformer and to convert the alternating current to impulsive current, the phase of which is adapted to be controlled by the grids of said valves, a modulator supplied by changes in the currents for physiotherapeutic use and acting so as to control said grids and a rhythm generator similarly supplied by a change in the currents produced by such changes and whereby said modulator is controlled, the anode of the modulator valve being supplied with current for physiotherapeutic use partly through a lead in which is located a resistance and connected to this anode and partly by a lead in which are located resistances and a D. C. voltage being maintained across one of those resistances by a condenser which voltage over a lead connected to the cathode of the modulator biases the grid of the modulator with respect to the cathode in such a manner that no current flows through the modulator between anode and cathode when no current flows through the load circuit of the rhythm generator, the grid of one of the generator tubes being thus connected to its cathode through the resistance, the working being such that when an alternating current flows in the load circuit of the rhythm generator the modulator tube becomes conducting at the rhythm of this current so as to cause to flow in the resistance a current adapted to bias the grid of one of the generator tubes negatively with respect to its cathode at this rhythm.

6. In a current impulse modulator device for physiotherapeutic applications in combination a transformer supplied externally by a generator of alternating current at the desired frequency two valves having control grids and arranged so as to be fed in current by said transformer and to convert the alternating current to continuous current, the intensity of which is adapted to be controlled by the grids of said valves, a modulator supplied by changes in the currents for physiotherapeutic use and acting so as to control said grids and a rhythm generator similarly supplied by a change in the currents produced by such changes and whereby said modulator is controlled, the anode of the modulator valve being supplied with current for physiotherapeutic use partly through a lead in which is located a resistance and connected to this anode and partly by a lead in which are located resistances, and a D. C. voltage being maintained across one of those resistances by a condenser which voltage over a lead connected to the cathode of the modulator biases the grid of the modulator with respect to the cathode in such a manner that no current flows through the modulator between anode and cathode when no current flows through the load circuit of the rhythm generator, the grid of one of the generator tubes being thus connected to its cathode through the resistance, the working being such that when an alternating current flows in the load circuit of the rhythm generator the modulator tube becomes conducting at the rhythm of this current so as to cause to flow in the resistance a current adapted to bias the grid of one of the generator tubes negatively with respect to its cathode at this rhythm.

7. A device of the class described, comprising: two valve means adapted to be supplied with current from an alternating current source and connected to convert said current into a unidirectionally pulsating current, at least one of said valve means including grid means for controlling the magnitude of said pulsating current; modulator means connected to said grid means; and rhythm generator means controlling said modulator means, said rhythm generator means including means for producing a periodically varying control potential of a frequency and wave shape which produces periodic variations in the instantaneous magnitude of said pulsating current, whereby said pulsating current is rendered suitable for physiotherapeutic use.

8. A device according to claim 7, wherein said rhythm generator means is energized by said varying pulsating current, said generator comprising delay means whereby said control potential is caused to have said frequency and wave shape.

9. A device according to claim 7, wherein said valves are connected in push-pull arrangement to be supplied with current from said source and in which said pulsating current includes a pulse for each half-wave of said alternating current from said source.

10. A device according to claim 9, in which the output of one of said valves remains substantially constant.

11. A device according to claim 7, in which said rhythm generator comprises self-oscillatory circuit means including a feed-back path, said device further comprising filter means included in said feed-back path for determining the frequency of said rhythm.

12. A device according to claim 11, wherein said filter means is an aperiodic filter of the high pass type, said filter comprising at least one non-reactive circuit element and at least one reactive circuit element.

13. A device according to claim 12, in which said non-reactive circuit element is a shunt resistor and said reactive circuit element is a series capacitor.

14. A device of the class described, comprising: a plurality of generators of therapeutic currents, each generator including at least one thermionic tube having an electrically heated cathode and an anode, the conductivity of said tube between said cathode and anode being determined at least in part by the temperature of said cathode, each generator being operative to produce a therapeutic current only when said cathode has attained a predetermined minimum temperature; circuit means for combining the currents from said generators; and relay means actuated during operation of one of said generators and having contacts for interrupting the supply of electricity to which heats one of said cathodes, whereby the current produced by one of said generators will be intermittently supplied to said circuit means at a rate determined by the heating and cooling of said one of said cathodes.

No references cited.